US 6,642,461 B2

(12) United States Patent
Imoto

(10) Patent No.: US 6,642,461 B2
(45) Date of Patent: Nov. 4, 2003

(54) DECELERATION IMPACT DETECTOR FOR USE IN AUTOMOTIVE VEHICLE

(75) Inventor: Masahiko Imoto, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/125,345

(22) Filed: Apr. 19, 2002

(65) Prior Publication Data
US 2003/0000816 A1 Jan. 2, 2003

(30) Foreign Application Priority Data

Jun. 29, 2001 (JP) ........................................ 2001-199397

(51) Int. Cl.⁷ ............................................... H01H 29/02
(52) U.S. Cl. .......................... 200/61.45 R; 200/61.44; 200/61.46; 200/61.48; 200/61.49; 200/61.52; 200/61.51
(58) Field of Search ..................... 200/61.45 R, 61.48, 200/61.44, 61.46, 61.49, 61.51, 61.52

(56) References Cited

U.S. PATENT DOCUMENTS 5,898,144 A    4/1999  Sakai et al.
6,093,897 A    7/2000  Inoue et al.
6,172,313 B1   1/2001  Sakamoto et al.

FOREIGN PATENT DOCUMENTS

| EP | 1 103 816 A1 | | 5/2001 |
| EP | 1 103 816 A  | * | 5/2001 |
| JP | A 2000-182488 | | 6/2000 |

* cited by examiner

Primary Examiner—Elvin Enad
Assistant Examiner—Jennifer A. Poker
(74) Attorney, Agent, or Firm—Oliff & Berridge, PLC

(57) ABSTRACT

A deceleration impact detector for detecting a vehicle collision or the like is composed of a rotor having an eccentric gravity center, a spring biasing the rotor to its initial position, a cam connected to rotor, and a pair of contacts consisting of a movable contact and a stationary contact. The rotor rotates together with the cam when a deceleration exceeding a predetermined level is imposed on the rotor. The pair of contacts are closed by the cam thereby to generate an electrical signal to inflate an air-bag. The movable contact is made of a resilient leaf spring, while the stationary contact is made of a plate having a high rigidity, so that resonant vibrations of the stationary contact otherwise caused by a high deceleration impact are avoided.

5 Claims, 7 Drawing Sheets

DECELERATION IMPACT DETECTOR FOR USE IN AUTOMOTIVE VEHICLE

CROSS-REFERENCE TO RELATED APPLICATION

This application is based upon and claims benefit of priority of Japanese Patent Application No. 2001-199397 filed on Jun. 29, 2001, the content of which is incorporated herein by reference.

BACKGROUND OF THE INVENTION

1. Field of the Invention

The present invention relates to a detector for detecting a deceleration impact exceeding a predetermined level caused by an accidental collision or the like. The detector is used, for example, to generate a signal for inflating an air-bag mounted on an automotive vehicle.

2. Description of Related Art

A conventional collision detector is disclosed, for example, in JP-A-2000-182488. The collision detector disclosed in this publication, as shown in FIG. 10, is composed of a rotor 110 rotatably supported by a rotor shaft 100, a cam 120 fixed to the rotor 110, a pair of contact springs 130, 140 which are closed by the cam 120 when the rotor 110 rotates by a predetermined rotational angle, and a printed circuit board 150 having an electrical circuit for generating a signal upon closing of the pair of contact springs 130, 140.

Referring to FIGS. 11 and 12, operation of this collision detector will be explained. When a deceleration is caused by a vehicle collision, the rotor 110 rotates in a direction shown by "b" against a biasing force Tset (in a direction shown by "a") of a contact spring 130. The contact spring 130 is pushed by the cam 120 rotating together with the rotor 110 and is resiliently deformed thereby to contact the other contact spring 140. Upon closing of the contact springs 130, 140, an electrical signal (an ON signal) for inflating an air-bag is generated.

However, there are following problems in this collision detector. (1) After the contact spring 130 contacts the other contact spring 140, the other contact spring 140 resonantly vibrates due to a collision impact, and thereby a contact between two contact springs 130, 140 cannot be maintained. Accordingly, a stable and reliable signal is not obtained form the collision detector. (2) Since the contact spring 130 biases the rotor 110 toward its initial position, an abrasion torque is always applied to the rotor 110. A dispersion of the abrasion torque causes a functional dispersion of the collision detector. (3) The contact spring 130 contacts the other contact spring 140 at a rotational angle, i.e., at an ON position shown in FIG. 12. Since after the ON position, the resilient force of the contact spring 140 is additionally applied to the rotor 110, a value Tset/MR (Tset is a biasing force in the direction "a" and MR is a rotational moment of the rotor in a direction "b") rapidly increases. Therefore, it is difficult to maintain the ON signal for a long time. (4) Since a housing base 170 is connected to a housing 160 supporting the rotor shaft 100, as shown in FIG. 11, a dimensional dispersion in connecting the housing base 170 to the housing 160 causes a dispersion in function of the collision detector. (5) A rotor assembly mounted on the housing 160 is inserted into an inside space of a casing 180, and a gap between the housing 160 and the casing 180 has to be sealed. If a sealing material is supplied into the gap, it leaks into the casing 180. Therefore, instead of using the sealing material, a packing 190 covering the bottom end of the casing 180 is disposed to provide a hermetical sealing, as shown in FIG. 10. Further, a lid 200 covering the packing 190 is connected to the bottom end of the casing 180 by heat-staking the bottom end. Use of the packing 190 and performing the heat-staking require an additional manufacturing cost.

SUMMARY OF THE INVENTION

The present invention has been made in view of the above-described problems, and an object of the present invention is to provide an improved deceleration impact detector which functions with a high stability and reliability and can be manufactured at a low cost.

The deceleration impact detector is used for detecting a high deceleration generated by an accidental collision of a vehicle or the like. An air-bag for protecting a passenger is inflated upon receipt of an electrical signal from the deceleration impact detector. The deceleration impact detector includes a rotor having its gravity center eccentric relative to a rotational center of the rotor, a coil spring biasing the rotor to its initial position, a cam connected to the rotor, and a contact member consisting of a resiliently movable contact and a stationary contact. When a deceleration exceeding a predetermined level is imposed on the rotor, the rotor rotates so that the cam connected to the rotor pushes the movable contact thereby to close the contact member. Upon closing the contact member, the detector generates an ON signal for operating the air-bag.

The movable contact is made of a resilient leaf spring and the stationary contact is made of a plate having a high rigidity, thereby to avoid resonant vibrations of the stationary contact upon receipt of a high deceleration impact. The movable contact is positioned apart from the cam, forming a certain space therebetween, when the rotor is at its initial position. In this manner, rotation of the rotor is not restricted by the resilient force of the movable contact.

The cam includes a first surface for pushing the movable contact and a second surface continuing from the first surface. The second cam surface is formed in a circular curvature around the rotational center of the rotor, so that the movable contact is not further pushed according to the rotation of the rotor after the contact member is closed. The electrical ON signal is maintained by the second cam surface while avoiding the resilient force of the movable contact from being applied to the rotor.

Components of the detector including the rotor, the coil spring and the contact member are mounted on a housing having a rectangular housing base. The rectangular housing base is press-fitted into a rectangular opening of a casing thereby to contain the housing in the casing. Flanges extending from the four corners of the housing base are formed, so that the flanges are tightly received on receiving surfaces formed at corners of the casing. The housing base and the casing are hermetically sealed with a filler material filling small spaces between the housing base and the casing. The housing base may be separated into two parts, a base frame and a base plate press-fitted into the base frame, both parts being connected by crank-shaped connecting pins formed by molding.

According to the present invention, the deceleration impact detector stably functioning with a high reliability and having a simple structure is manufactured at a low cost.

Other objects and features of the present invention will become more readily apparent from a better understanding of the preferred embodiment described below with reference to the following drawings.

DETAILED DESCRIPTION OF THE PREFERRED EMBODIMENT

Figure 1:
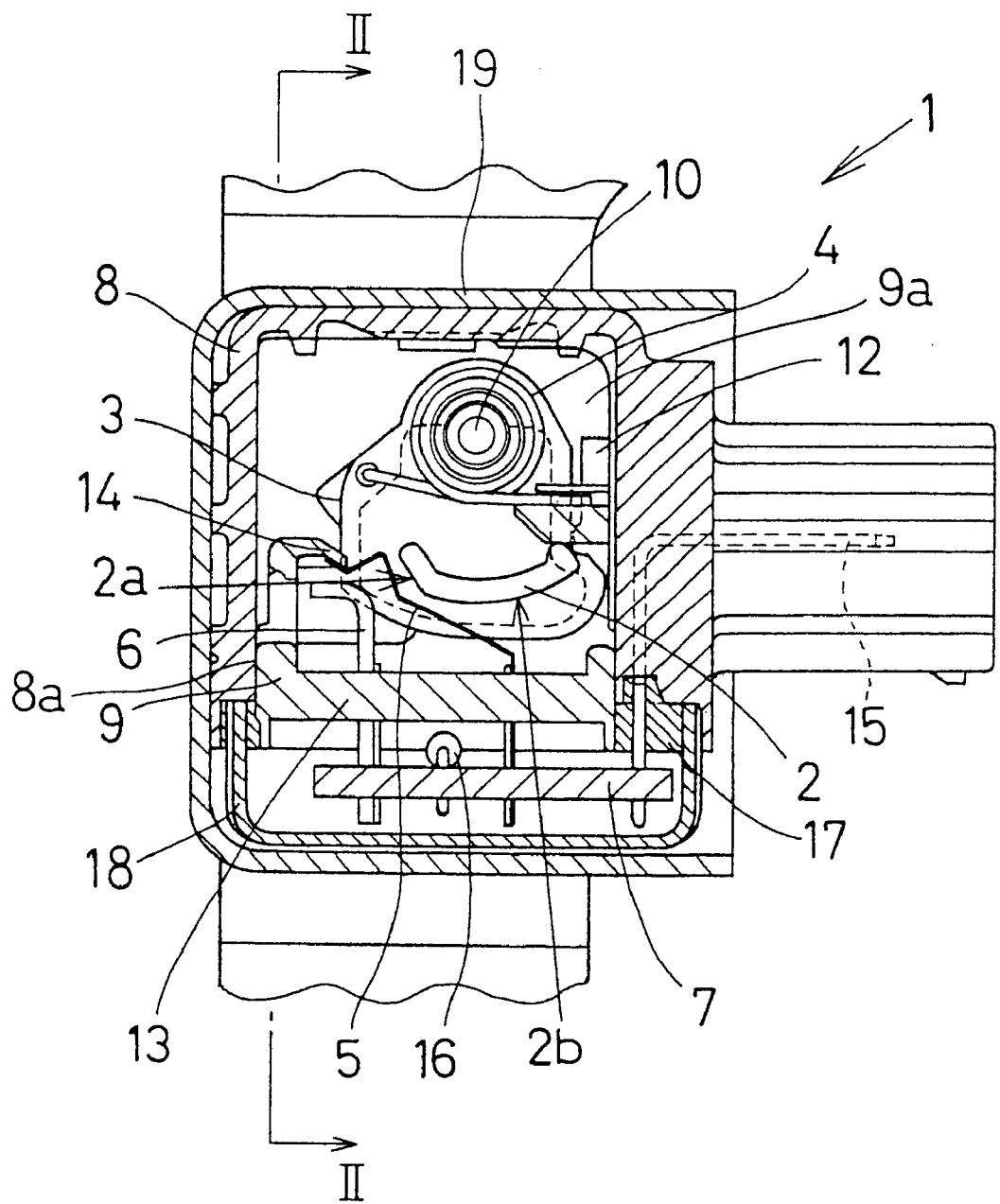
FIG. 1 is a cross-sectional view showing a deceleration impact detector according to the present invention, taken along line I—I shown in FIG. 2.
Figure 2:
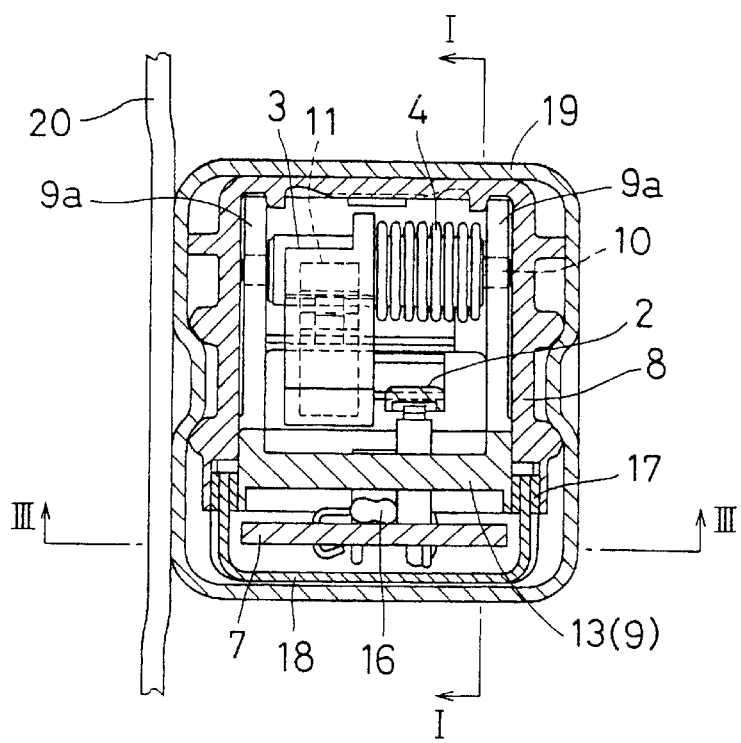
FIG. 2 is a cross-sectional view showing the deceleration impact detector, taken along line II—II shown in FIG. 1.

A preferred embodiment of the present invention will be described with reference to FIGS. 1–6. A deceleration impact detector 1 detects an accidental collision of an automotive vehicle, for example. As shown in FIGS. 1 and 2, the deceleration impact detector 1 is substantially composed of: a rotor 3 having a cam 2; a coil spring 4 for biasing the rotor 3 to its initial position; a contact member consisting of a movable contact 5 and a stationary contact 6, that is closed when the rotor 3 rotates by a predetermined rotational angle from its initial position; a printed circuit board 7 having an electrical circuit for generating an ON signal when the contact member is closed; and a casing 8 for containing a rotor assembly "A" shown in FIG. 5 therein.

A rotor shaft 10 connected to the rotor 3 is rotatably supported by a pair of upright walls 9a of a housing 9 as shown in FIG. 2. A weight 11 is connected to the rotor 3 so that a gravity center of the rotor 3 is eccentrically positioned with respect to the rotor shaft 10. The cam 2, as shown in FIG. 1, includes a first cam surface 2a and a second cam surface 2b, both surfaces being formed continuously to each other. The first cam surface 2a is formed at a tip end of the cam 2 with a slant angle so that it pushes the movable contact 5 toward the stationary contact 6 to close both contacts when the rotor 3 rotates by a predetermined rotational angle. The second cam surface 2b has a circular curvature with respect to the rotational center of the rotor shaft 10, so that the movable contact 5 is not further pushed toward the stationary contact 6 by the second cam surface 2b after both contacts 5, 6 are once closed. In other words, the movable contact 5 maintains its position after it once contacts the stationary contact 6 even if the rotor 3 further rotates.

The coil spring 4 is fixed to the housing 9 at its one end and is connected to the rotor 3 at the other end. The rotor 3 is biased to its original position, being pushed against a stopper 12 formed in the housing 9 by a resilient force of the coil spring 4. The contact member is composed of the movable contact 5 made of a resilient leaf spring and the stationary contact 6, both contacts being fixed to a housing base 13 at their ends. More particularly, as shown in FIG. 1, the resilient movable contact 5 is anchored to the housing base 13 at its one end and abuts against an angled stopper 14 at the other end. The movable contact 5 includes a projected portion which is pushed toward the stationary contact 6 by the cam 2 when the rotor 3 rotates by a predetermined rotational angle. When the rotor 3 stays at its initial position, a certain space is formed between the first cam surface 2a and the projected portion of the movable contact 5.

Figure 5:
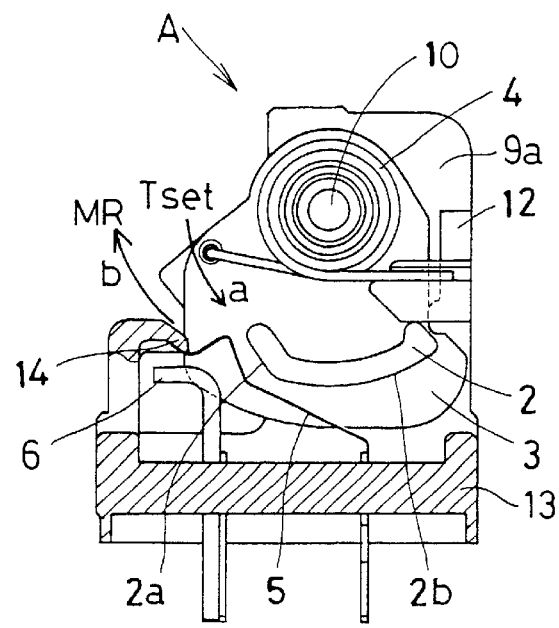
FIG. 5 is a drawing showing a rotor assembly to be housed in a casing of the deceleration impact detector.

The stationary contact 6 is made of a metallic plate having a thickness several times thicker than that of the movable contact 5 to secure a sufficient rigidity not to cause resonant vibrations when a high collision impact is imposed on the stationary contact 6. An end portion of the stationary contact 6 is bent toward an opposite side of the cam 2, as shown in FIG. 1, not to interfere with rotation of the rotor 3. The printed circuit board 7 having an electric circuit thereon is mounted on the housing base 13 after the rotor assembly "A" shown in FIG. 5 is disposed in the casing 8. Terminal portions of the movable contact 5 and the stationary contact 6, lead out through the housing base 13, are electrically connected to the printed circuit board 7. One end of an output terminal 15 and a resistor 16 are also electrically connected to the circuit board 7.

Figure 3:
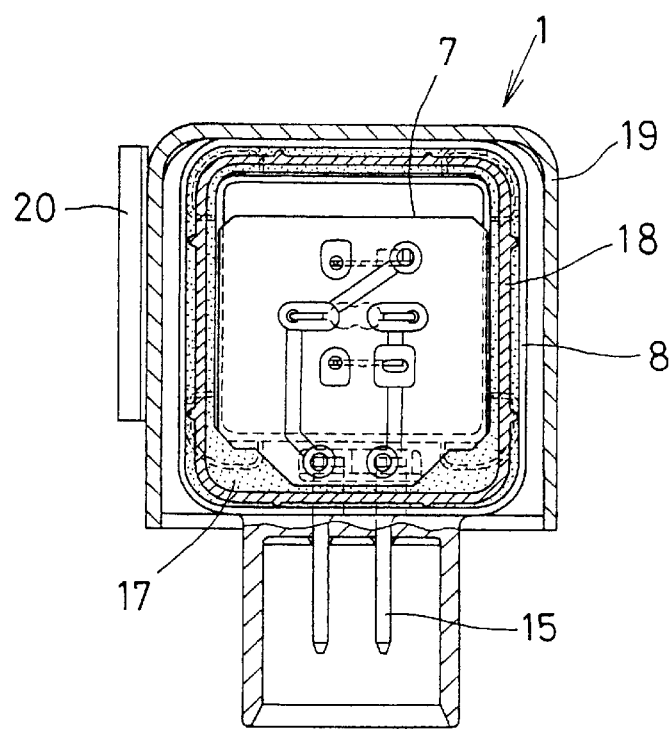
FIG. 3 is a cross-sectional view showing the deceleration impact detector, taken along line III—III showing in FIG. 2.
Figure 4A:
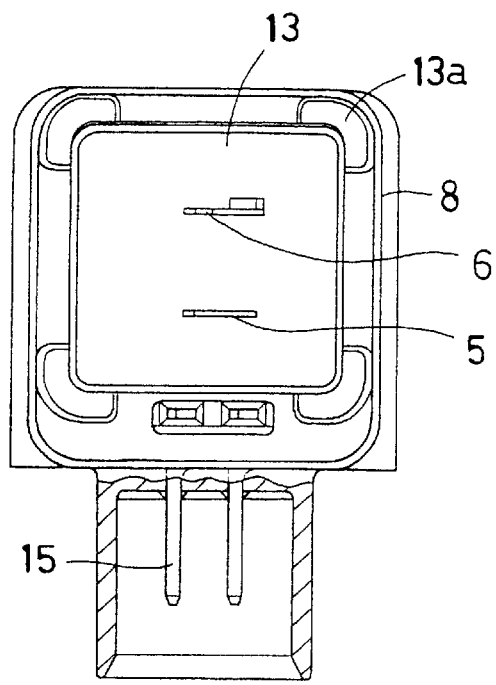
FIG. 4A is a plan view showing a housing base having flanges used in the deceleration impact detector.
Figure 4B:
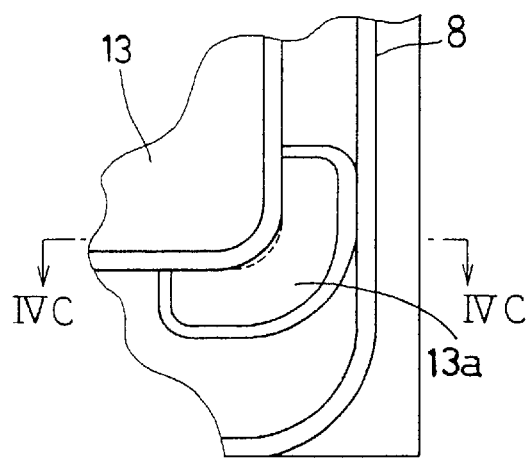
FIG. 4B is a partial plan view showing the flange of the housing base in an enlarged scale.
Figure 4C:
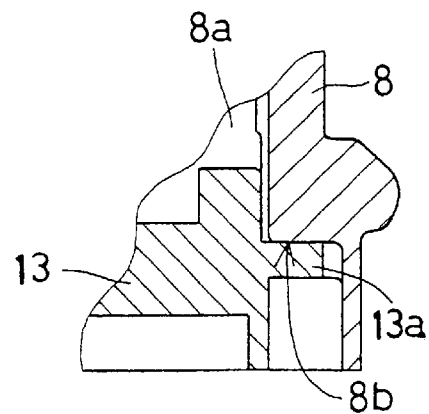
FIG. 4C is a partial cross-sectional view showing a structure connecting the housing base to a casing, taken along line IVC—IVC shown in FIG. 4B.

The rotor 3 having the cam 2, the coil spring 4, the movable contact 5 and the stationary contact 6 are all mounted on the housing 9 having the housing base 13 and the upright walls 12a, forming the rotor assembly "A" shown in FIG. 5. The rotor assembly "A" is contained in the casing 8 so that the housing base 13 closes an rectangular bottom opening 8a of the casing 8, as shown in FIGS. 4A–4C. The housing base 13 is press-fitted to the rectangular bottom opening 8a. The housing base 13, as shown in FIG. 4A, has flanges 13a formed at four corners thereof, while the casing 8, as shown in FIG. 4C, includes surfaces 8b for receiving the flanges 13a thereon. After the rotor assembly "A" is contained in the casing 8 and the printed circuit board 7 is electrically connected to the rotor assembly "A", a bottom surface of the printed circuit board 7 is covered with a lid 18, as shown in FIGS. 1 and 2. A space between the lid 18 and an outer periphery of the housing base 13 and a space between the lid 18 and an inner periphery of the casing 8 are hermetically sealed with a filler material 17, as shown in FIGS. 1–3. Then, the casing 8 containing all the components therein is inserted in a outer casing 19 having a mounting bracket 20. The deceleration impact detector 1 thus made is mounted on a vehicle via the mounting bracket 20.

Figure 6:
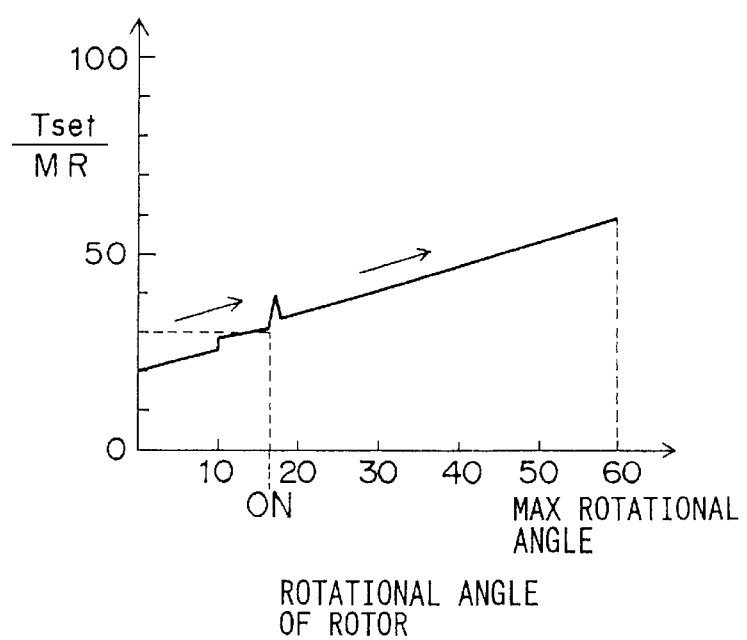
FIG. 6 is a graph showing a relation between a value of Tset/MR and an rotational angle of a rotor.

Operation of the deceleration detector 1 will be described with reference to FIGS. 5 and 6. When a deceleration caused by a collision is imposed on the deceleration impact detector 1, a rotational moment MR is generated in the rotor 3 due to its inertia in a direction "b" shown in FIG. 5. If the rotational moment MR exceeds a biasing force Tset of the coil spring 4 exerted in a direction "a", the rotor 3 rotates in the direction "b". When the rotor 3 rotates to a predetermined angular position (an ON position shown in FIG. 6), the first cam surface 2a pushes the movable contact 5 toward the stationary contact 6. The movable contact 5 resiliently deforms and contacts the stationary contact 6.

As the rotor 3 further rotates, a contact point between the cam 2 and the movable contact 5 moves from the first cam surface 2a to the second cam surface 2b. Since the second cam surface 2b is formed in a circular arc around the rotational center of the rotor shaft 10, the position of the movable contact 5 does not change during a period in which it contacts the second cam surface 2b. Therefore, a contacting force between the movable contact 5 and the stationary contact 6 is maintained unchanged when the rotor 3 further rotates from the ON position. Accordingly, the rotation of the rotor 3 is not unduly restricted by the resilient force of the movable contact 5. Only an abrasion force between the second cam surface 2b and the movable contact 5 is applied to the rotor 3. As shown in FIG. 6, the value Tset/MR gradually increases according to the rotational angle of the rotor 3.

Advantages of the present invention will be summarized below. Since the stationary contact 6 has a high rigidity and a movable contact 5 is resilient, the stationary contact 6 does not resonantly vibrates due to a high collision impact after both contacts are closed. Therefore, a stable ON signal can be obtained from the detector 1. Since a certain space between the movable contact 5 and the cam 2 is provided until the first cam surface 2a contacts the movable contact 5, no abrasion force is applied from the resilient movable contact 5 to the cam 2. Therefore, the rotational torque of the rotor 3 is not affected by a dispersion of the abrasion force. Accordingly, a dispersion of the rotational angle at which the ON signal is generated can be made small. Since the movable contact 5 abuts against the stopper 14 with its resilient force, the movable contact 5 does not erroneously contact the stationary contact 5 if a small shock is applied thereto by driving on a rough road.

Since the second cam surface 2b is formed in a circular shape around the rotational center of the rotor shaft 10, the position of the movable contact 5 does not change during a period in which the movable contact 5 is contacting the second cam surface 2b. Further, since the resilient force of the movable contact 5 is applied to the rotor 3 in a direction toward the rotational center of the rotor shaft 10, the resilient force of the movable contact 5 does not suppress the rotation of the rotor 3. The force suppressing the rotation is only a small abrasion force between the movable contact 5 and the second cam surface 2b. Therefore, the rotor 3 smoothly rotates after the ON point, and the ON signal is stably generated.

Since the flanges 13a formed at four corners of the housing base 13 are closely mounted on the receiving surfaces 8b of the casing 8, as shown in FIG. 4C, the filling material 17 filling a space between the housing base 13 and the casing 8 is prevented from flowing out into the inside space of the casing 8. Therefore, the inside space of the casing 8 is hermetically sealed by the filling material 17, and it is not necessary to fix the lid 18 to the bottom of the casing 8 by heat-staking as done in a conventional detector. Further, it is not necessary to use a packing for providing the hermetical sealing. Accordingly, the manufacturing cost of the detector 1 can be reduced.

Figure 7:
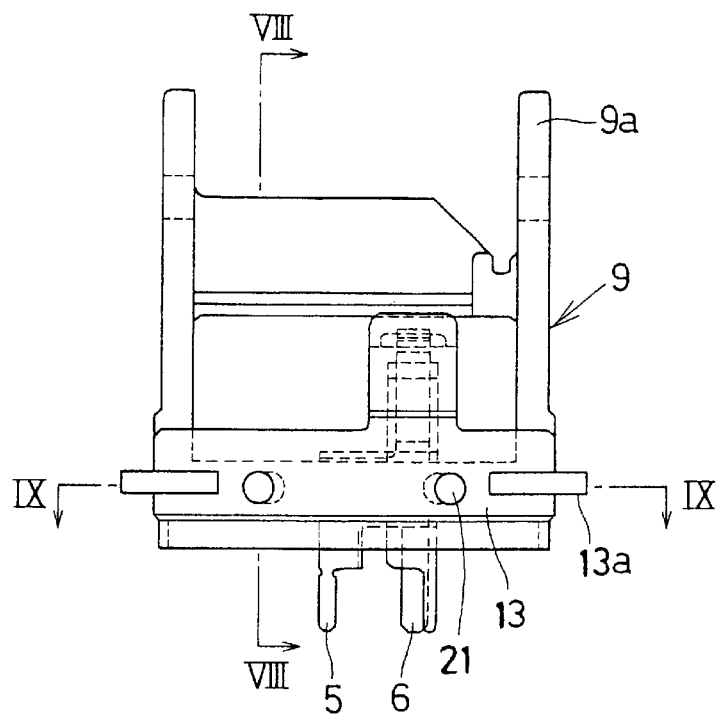
FIG. 7 is a front view showing a modified form of a housing of the deceleration impact detector.
Figure 8:
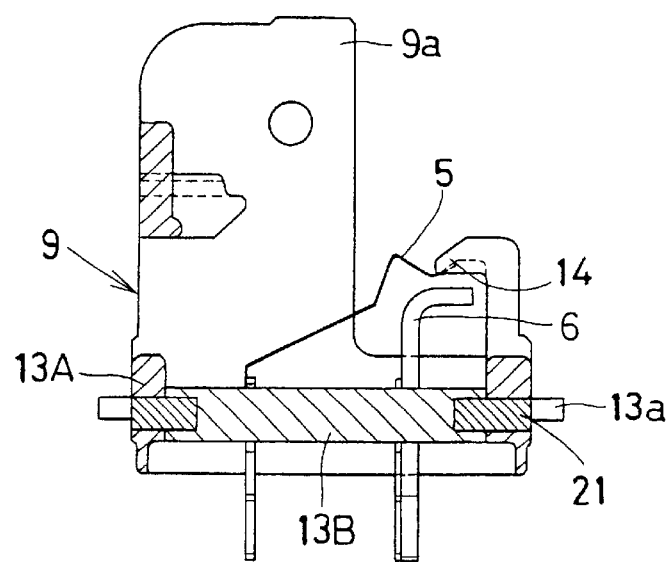
FIG. 8 is a cross-sectional view showing the modified form of the housing, taken along line VIII—VIII shown in FIG. 7.
Figure 9:
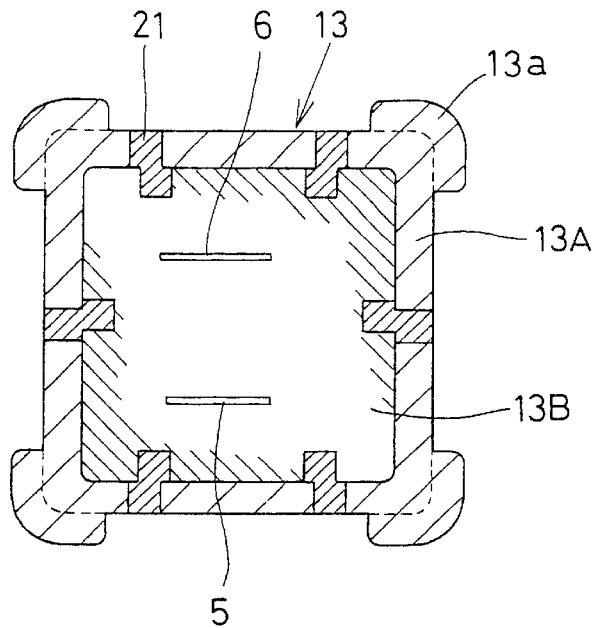
FIG. 9 is a cross-sectional view showing a housing base of the modified form of the housing, taken along line IX—IX shown in FIG. 7.
Figure 10:
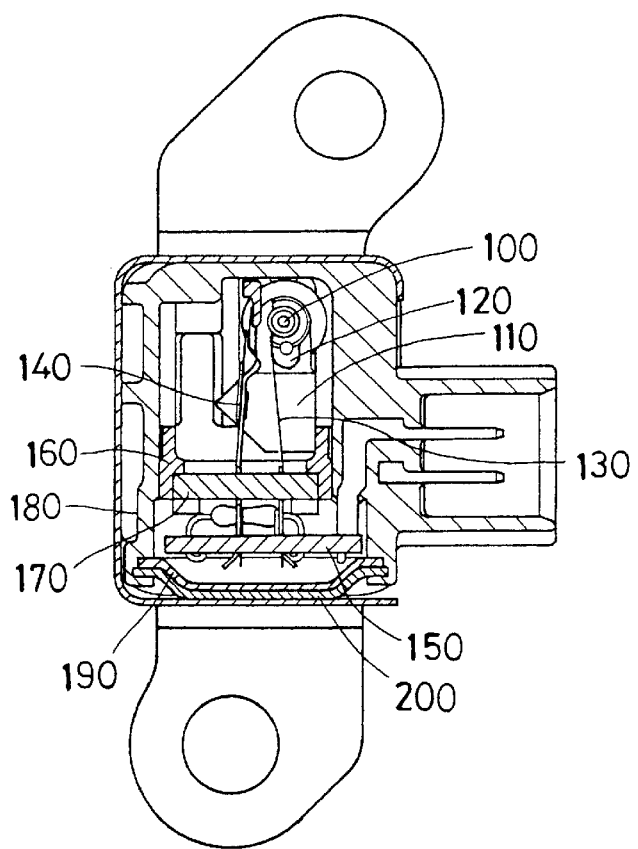
FIG. 10 is a cross-sectional view showing a conventional collision detector.
Figure 11:
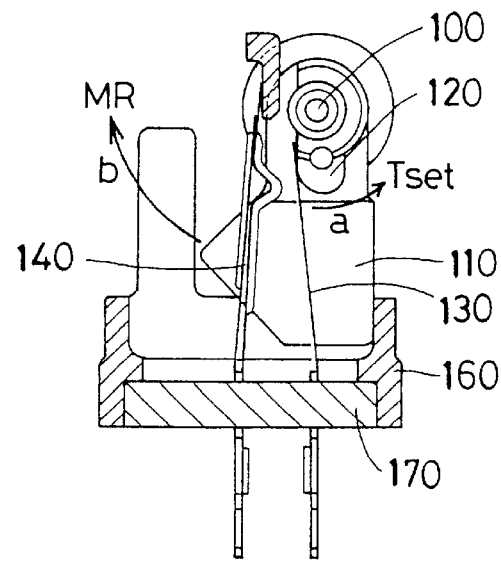
FIG. 11 is a drawing showing a rotor assembly used in the conventional collision detector.
Figure 12:
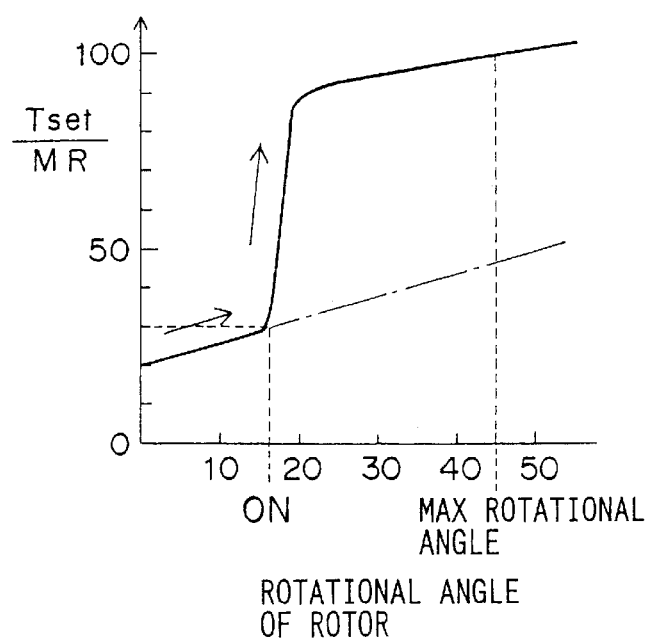
FIG. 12 is a graph showing a relation between a value of Tset/MR and a rotational angle in the conventional collision detector.

The housing base 13 may be modified to a form shown in FIGS. 7–9. In this modified form, the housing base 13 is composed of a base frame 13A having a pair of upright walls 9a, and a base plate 13B. The base plate 13B supports the movable contact 5 and the stationary contact 6 thereon. The base plate 13B is press-fitted into the base frame 13A and connected thereto by connecting pins 21. The connecting pins 21 are formed by a secondary molding after the base plate 13B is inserted into the base frame 13A. The connecting pins 21 are formed in a crank-shape as shown in FIG. 9. The base plate 13B and the base frame 13A can be firmly connected by the crank-shaped connecting pins 21.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A deceleration impact detector, comprising:

a rotor supported by a rotor shaft, the rotor having a gravity center eccentric relative to the rotor shaft;

a cam rotating together with the rotor around the rotor shaft;

a biasing member for biasing the rotor toward an initial position of the rotor; and a contact member having a single pair of contacts adapted to be closed by being pushed by the cam when the rotor rotates by a predetermined rotational angle from the initial position, wherein the contact member is composed of a movable contact made of a resilient leaf spring and a stationary contact having a high rigidity, and the movable contact is portioned apart from the cam by a predetermined distance when the rotor is at its initial position.

2. The deceleration impact detector as in claim 1, wherein:

the cam includes a first cam surface for pushing the movable contact to close the contact member and a second cam surface connected to the first cam surface, the second cam surface having a circular curvature having its center at a rotational center of the rotor.

3. The deceleration impact detector as in claim 1, wherein:

detector components including the rotor, the cam, the biasing member and the contact member are mounted on a housing having a rectangular housing base, the housing base including flanges extending from corners thereof; and the housing base is press-fitted into a rectangular opening of a casing, the rectangular opening including receiving surfaces formed at corners thereof for receiving the flanges thereon.

4. The deceleration impact detector as in claim 3, wherein:

the housing base is composed of: a base frame having a pair of upright walls for supporting the rotor shaft and an opening; and a base plate;

the base plate is press-fitted into the opening of the base frame and is connected to the base frame by connecting pins formed by molding at a boundary of the base plate and the base frame.

5. The deceleration impact detector as in claim 4, wherein each of the connecting pins is formed in a crank-shape, and an angled potion for forming the crank-shape is positioned at the boundary of the base plate and the base frame.

* * * * *